(12) United States Patent
Dubnicki et al.

(10) Patent No.: US 7,992,037 B2
(45) Date of Patent: Aug. 2, 2011

(54) SCALABLE SECONDARY STORAGE SYSTEMS AND METHODS

(75) Inventors: Cezary Dubnicki, Warsaw (PL); Cristian Ungureanu, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 156 days.

(21) Appl. No.: 12/511,126

(22) Filed: Jul. 29, 2009

(65) Prior Publication Data
US 2010/0064166 A1    Mar. 11, 2010

Related U.S. Application Data

(60) Provisional application No. 61/095,994, filed on Sep. 11, 2008.

(51) Int. Cl.
*G06F 11/00* (2006.01)
(52) U.S. Cl. .............. 714/6.2; 714/6.3; 714/15
(58) Field of Classification Search .......... 714/6, 7, 714/15, 6.2, 6.22, 6.3
See application file for complete search history.

(56) References Cited

U.S. PATENT DOCUMENTS

| | | | |
|---|---|---|---|
| 7,552,356 B1 * | 6/2009 | Waterhouse et al. ............. 714/6 |
| 7,734,643 B1 * | 6/2010 | Waterhouse et al. ......... 707/770 |
| 7,743,023 B2 * | 6/2010 | Teodosiu et al. .............. 707/612 |
| 7,778,970 B1 * | 8/2010 | Caronni et al. ............... 707/616 |
| 7,818,607 B2 * | 10/2010 | Turner et al. ....................... 714/6 |
| 2004/0215622 A1 * | 10/2004 | Dubnicki et al. ............... 707/10 |
| 2005/0135381 A1 * | 6/2005 | Dubnicki et al. ........ 370/395.32 |
| 2007/0177739 A1 * | 8/2007 | Ganguly et al. ............. 380/277 |
| 2007/0208748 A1 | 9/2007 | Li |
| 2008/0005334 A1 * | 1/2008 | Utard et al. .................... 709/226 |
| 2008/0201335 A1 | 8/2008 | Dubnicki et al. |
| 2008/0201428 A1 | 8/2008 | Dubnicki et al. |

OTHER PUBLICATIONS

EMC Centera Family. Content Addressed Storage, Data Archiving. 2009. (2 pages) http://www.emc.com/products/family/emc-centera-family.htm?-openfolder=platform.

Quinlan, S., et al. Venti: A New Approach to Archival Storage. Proceedings of the FAST 2002 Conference on File and Storage Technologies. USENIX Association. Jan. 2002. (14 pages) http://www.usenix.org/publications/library/proceedings/fast02/quinlan/quinlan.pdf.

Zhu, B., et al. Avoiding the Disk Bottleneck in the Data Domain Deduplication File System. Proceedings of the FAST 2008 (6th) Conference on File and Storage Technologies. USENIX Association. Feb. 2008. pp. 269-282. http://www.usenix.org/events/fast08/tech/full_papers/zhu/zhu.pdf.

* cited by examiner

*Primary Examiner* — Robert Beausoliel, Jr.
*Assistant Examiner* — Joshua P Lottich
(74) *Attorney, Agent, or Firm* — James Bitetto; Joseph Kolodka

(57) ABSTRACT

Exemplary systems and methods in accordance with embodiments of the present invention may provide a plurality of data services by employing splittable, mergable and transferable redundant chains of data containers. The chains and containers may be automatically split and/or merged in response to changes in storage node network configurations and may be stored in erasure coded fragments distributed across different storage nodes. Data services provided in a distributed secondary storage system utilizing redundant chains of containers may include global deduplication, dynamic scalability, support for multiple redundancy classes, data location, fast reading and writing of data and rebuilding of data due to node or disk failures.

18 Claims, 10 Drawing Sheets

SCALABLE SECONDARY STORAGE SYSTEMS AND METHODS

RELATED APPLICATION INFORMATION

This application claims priority to provisional application Ser. No. 61/095,994 filed on Sep. 11, 2008, incorporated herein by reference.

BACKGROUND

1. Technical Field

The present invention relates generally to storage of data and, more particularly, to storage of data in a secondary storage system.

2. Description of the Related Art

The development of secondary storage technology, an important aspect of the enterprise environment, has had to keep pace with increasingly strenuous demands imposed by enterprises. For example, such demands include the simultaneous provision of varying degrees of reliability, availability and retention periods for data with different levels of importance. Further, to meet regulatory requirements, such as the Sarbanes-Oxley ACT (SOX), the Health Insurance Portability and Accountability Act (HIPPA), the Patriot Act, and SEC rule 17a-4(t), enterprise environments have demanded improved security, traceability and data audit from secondary storage systems. As a result, desirable secondary storage architectures define and institute strict data retention and deletion procedures rigorously. Furthermore, they should retain and recover data and present data on demand, as failing to do so may result not only in a serious loss to business efficiency, but also in fines and even criminal prosecution. Moreover, because business enterprises oftentimes employ relatively limited information technology (IT) budgets, efficiency is also of primary importance, both in terms of improving storage utilization and in terms of reducing mounting data management costs. In addition, with ever increasing amounts of data produced and fixed backup windows associated therewith, there is a clear need for scaling performance and backup capacity appropriately.

Substantial progress has been made to address these enterprise needs, as demonstrated by advancements in disk-targeted de-duplicating virtual tape libraries (VTLs), disk-based backend servers and content-addressable archiving solutions. However, existing solutions do not adequately address the problems associated with the exponential increase in the amount of data stored in secondary storage.

For example, unlike primary storage, such as a storage area network (SAN), which is usually networked and under common management, secondary storage comprises a large number of highly-specialized dedicated components, each of them being a storage island entailing the use of customized, elaborate, and often manual, administration and management. Thus, a large fraction of the total cost of ownership (TCO) can be attributed to management of a greater extent of secondary storage components.

Moreover, existing systems assign a fixed capacity to each storage device and limit duplicate elimination to only one device, which results in poor capacity utilization and leads to wasted space caused by duplicates stored on multiple components. For example, known systems include large Redundant Array of Inexpensive Disks (RAID) systems, which provide a single control box containing potentially multiple, but limited number of controllers. The data organization of these systems is based on a fixed-size block interface. Furthermore, the systems are limited in that they employ a fixed data redundancy scheme, utilize a fixed maximal capacity, and apply reconstruction schemes that rebuild entire partitions even if they are empty. Moreover, they fail to include a means for providing duplicate elimination, as duplicate elimination with such systems must be implemented in higher layers.

Other known systems deliver advanced storage in a single box, such as DataDomain, or clustered storage, such as EMC Centera. The disadvantages in these types of systems are that they provide limited capacity and performance, employ per-box duplicate elimination as opposed to a global one (DataDomain) or are based on entire files (EMC Centera). Although these systems deliver some of the advanced services such as deduplication, they are often centralized and metadata/data stored by these systems do not have redundancy beyond standard RAID schemes.

Finally, because each of these known secondary storage devices offers fixed, limited performance, reliability and availability, the high overall demands of enterprise secondary storage in these dimensions are very difficult to meet.

SUMMARY

Methods and systems in accordance with various exemplary embodiments of the present invention address the deficiencies of the prior art by providing a data organization scheme that facilitates the implementation of several different data services. Furthermore, exemplary systems and methods provide improvements over the prior art, as exemplary implementations permit dynamicity by automatically reacting to changing network configurations and by providing redundancy. In particular, exemplary implementations may split, merge, and/or transfer data containers and/or chains of data containers in response to changing network configurations, which is a significant advantage over known processes.

In one exemplary embodiment of the present invention, a method for managing data on a secondary storage system includes distributing data blocks to different data containers located in a plurality of different physical storage nodes in a node network to generate redundant chains of data containers in the nodes; detecting an addition of active storage nodes to the network; automatically splitting at least one chain of containers in response to detecting the addition; and transferring at least a portion of data split from the at least one chain of containers from one of said storage nodes to another of said storage nodes to enhance system robustness against node failures.

In an alternate exemplary embodiment of the present invention, a secondary storage system includes a network of physical storage nodes, wherein each storage node includes a storage medium configured to store fragments of data blocks in a chain of data containers that is redundant with respect to chains of data containers in other storage nodes; and a storage server configured to detect an addition of active storage nodes to the network, to automatically split at least one chain of containers on said storage medium in response to detecting the addition, and to transfer at least a portion of data split from the at least one chain of containers to a different storage node to enhance system robustness against node failures.

In an alternate exemplary embodiment of the present invention, a method for managing data on a secondary storage system includes distributing data blocks to different data containers located in a plurality of different physical storage nodes in a node network to generate redundant chains of data containers in the nodes; detecting a change in the number of active storage nodes in the network; and automatically merging at least one data container located in one of said storage nodes with another data container located in a different storage node in response to detecting the change to ensure manageability of the containers.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
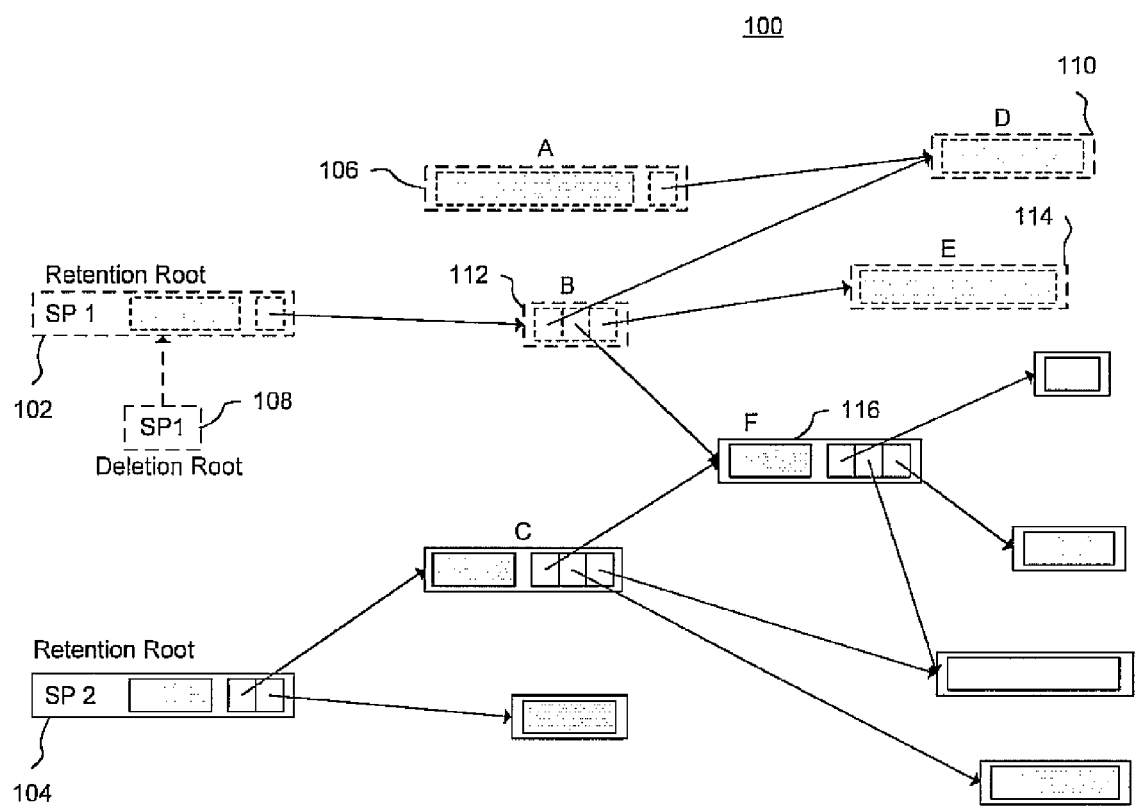
FIG. 1 is a block/flow diagram of a data block organization scheme in a backend portion of a secondary storage system in accordance with one exemplary implementation of the present principles.

As indicated above, to satisfy commercial demands, distributed secondary storage systems should be capable of performing a variety of services, including: fast determination of availability of stored data (i.e. determination of whether it can be read or whether it is lost); support for multiple data redundancy classes; fast determination of data redundancy level for any given moment (i.e. determination of how many node/disk failures a given piece of data can endure without losing it); in the case of a diminished redundancy level, fast rebuilding of data up to a specified redundancy level; data writing and reading with a high level of performance; providing dynamic scalability by adjusting data location in response to changes in network configuration (for example, new nodes are added and/or old nodes are removed or failed); on-demand data deletion; and global, efficient duplicate elimination.

While any one of these data services are relatively simple to implement on their own, such as high-performance global deduplication, dynamic scalability in a distributed system, deletion services, and failure recovery, it is rather difficult to provide each of them together. For example, there is a tension between providing deduplication and dynamic scalability, as determining the location of duplicated data is difficult when a storage system grows or the configuration of storage nodes changes. In addition, there is a conflict between providing deduplication and on-demand deletion. For example, to prevent the loss of data, deduplication of data that has been scheduled for deletion should be avoided. There is also a tension between providing failure tolerance and deletion, as deletion decisions should be consistent in the event of a failure.

As discussed above, current secondary storage systems, such as RAID, for example, fail to adequately provide a combination of such data services. Exemplary implementations of the present invention address the deficiencies of the prior art by providing a novel means for balancing the demand imposed by different types of data services while maintaining efficiency and performance. For example, exemplary data organization schemes described below permit the resolution of tensions and conflicts between these services and facilitate the implementation of each of these services in a secondary storage system.

As discussed herein below, exemplary embodiments of the present invention include commercial storage systems that comprise a backend architectured as a grid of storage nodes. The front-end may comprise a layer of access nodes scaled for performance, which may be implemented using a standard file system interface, such as, for example, network file system (NFS) or common internet file system (CIFS) protocols, as understood by those of ordinary skill in the art. The present principles disclosed herein are primarily directed to the backend portion of secondary storage systems, which may be based on content addressable storage.

In accordance with exemplary implementations of the present principles, secondary storage capacity may be dynamically shared among all clients and all types of secondary storage data, such as back-up data and archive data. In addition to capacity sharing, system-wide duplicate elimination as described herein below may be applied to improve storage capacity efficiency. Exemplary system implementations are highly-available, as they may support on-line extensions and upgrades, tolerate multiple node and network failures, rebuild data automatically after failures and may inform users about recoverability of the deposited data. The reliability and availability of the stored data may be additionally dynamically adjusted by the clients with each write because the backend may support multiple data redundancy classes, as described more fully below.

Exemplary embodiments of the present principles may employ various schemes and features that are modified as discussed below to implement efficient data services such as data rebuilding, distributed and on-demand data deletion, global duplicate elimination and data integrity management. Such features may include utilizing modified content-addressable storage paradigms, which enables cheap and safe implementation of duplicate elimination. Other features may include the use of modified distributed hash tables, which permit the building of a scalable and failure-resistant system and the extension of duplicate elimination to a global level. Further, erasure codes may be employed to add redundancy to stored data with fine-grain control between a desired redundancy level and resulting storage overhead. Hardware implementations may utilize large, reliable SATA disks which deliver vast raw but inexpensive storage capacity. Multicore CPUs may also be employed, as they provide inexpensive, yet powerful computing resources.

Exemplary system implementations of the present principles may also be scalable to at least thousands of dedicated storage nodes or devices, resulting in a raw storage capacity on the order of hundreds of petabytes, with potentially larger configurations. Although a system implementation may comprise a potentially large number of storage nodes, a system may externally behave as one large system. Furthermore, it should also be noted that system implementations discussed herein below need not define one fixed access protocol, but may be flexible to permit support for both legacy applications using standards such as file system interface and new applications using highly-specialized access methods. New protocols may be added on-line with new protocol drivers, without interruptions for clients using existing protocols. Thus, system implementations may support both customized, new applications and commercial legacy applications if they use streamed data access.

Other exemplary features of secondary storage implementations may permit continuous operation of the system during various scenarios, as they may limit or eliminate the impact of failures and upgrades and extensions on data and system accessibility. Due to a distributed architecture, it is often possible to keep non-stop system availability even during hardware or software upgrade, for example, rolling upgrade, thereby eliminating need for any costly downtime. Moreover, exemplary systems are capable of automatic self-recovery in the event of hardware failures due to disk failures, network failures, power loss and even from certain software failures. In addition, exemplary systems may withstand specific, configurable numbers of fail-stops and intermittent hardware failures. Further, several layers of data integrity checking may be employed to detect random data corruption.

Another important function of exemplary systems is to ensure high data reliability, availability and integrity. For example, each block of data may be written with a user-selected redundancy level, permitting the block to survive up to a requested number of disk and node failures. The user-selectable redundancy level may be achieved by erasure coding each block into fragments. Erasure codes increase mean time to failure by many orders of magnitude over simple replication for the same amount of space overhead. After a failure, if a block remains readable, system implementations may automatically schedule data rebuilding to restore redundancy back to the level requested by the user. Moreover, secondary storage system implementations may ensure that no permanent data loss remains hidden for long. The global state of the system may indicate whether all stored blocks are readable, and if so, it may indicate how many disk and node failures may be withstood before data loss occurs.

Referring now in detail to the figures in which like numerals represent the same or similar elements and initially to FIG. 1, a representation 100 of data block organization structure in a backend portion of a secondary storage system in accordance with one exemplary implementation of the present principles is illustrated. The programming model for the data block organization is based on an abstraction of a sea of variable-sized, content-addressed, highly-resilient blocks. A block address may be derived from a hash, for example a SHA-1 hash, of its content. A block may comprise data and, optionally, an array of pointers, pointing to already written blocks. Blocks may be variable-sized to allow for a better duplicate elimination ratio. In addition, pointers may be exposed to facilitate data deletion implemented as "garbage collection," a type of memory management process in which memory that is no longer used by objects is reclaimed. Further, the backend portion of the secondary storage system may export a low-level block interface used by protocol drivers to implement new and legacy protocols. Provision of such a block interface instead of a high-level block interface, such as file system, may simplify the implementation and permit a clean separation of the backend from the front-end. Moreover, such an interface also permits efficient implementation of a wide range of many high-level protocols.

As illustrated in FIG. 1, blocks in the backend portion of a secondary storage system may form directed acyclic graphs (DAG). The data portion of each block is shaded while the pointer portions are not shaded. Drivers may be configured to write trees of the data blocks. However, because of a deduplication feature of the exemplary secondary storage system, these trees overlap at deduplicated blocks and form directed graphs. Additionally, as long as the hash used for the block address is secure, no cycle is possible in these structures.

A source vertex in a DAG is usually a block of a special block type referred to as a "searchable retention root." Besides regular data and an array of addresses, a retention root may be configured to include a user-defined search key used to locate the block. Such a key can be arbitrary data. A user may retrieve a searchable block by providing its search key instead of a cryptic block content address. As a result, a user need not remember the content address to access stored data. For example, multiple snapshots of the same file system can have each root organized as a searchable retention root with a search key comprising a file system name and a counter incremented with each snapshot. Searchable blocks do not have user-visible addresses and cannot be pointed to. As such, searchable blocks cannot be used to create cycles in block structures.

With reference again to FIG. 1, the set of blocks 100 includes three source vertices 102, 104, and 106, two of which, 102 and 104, are retention roots. The other source vertex 106 is a regular block A, which indicates that this part of the DAG is still under construction.

The application programming interface (API) operations may include writing and reading regular blocks, writing searchable retention roots, searching for a retention root based on its search key, and marking a retention root with a specified key to be deleted by writing an associated deletion root, as discussed below. It should be noted that cutting a data stream into blocks may be performed by drivers.

In accordance with one exemplary aspect of the present principles, on writing a block, a user may assign the block to one of a plurality of available redundancy classes. Each class may represent a different tradeoff between data redundancy and storage overhead. For example, a block in a low redundancy data class may survive only one disk failure, while storage overhead for its block size is minimal. In turn, a block in a critical data class may be replicated many times on different disks and physical nodes. A secondary storage system of the present principles may support a range of different redundancy classes between these two extremes.

It should also be noted that exemplary secondary storage systems should not provide a way to delete a single block directly because such a block may be referenced by other blocks. Rather, an API may permit a user to indicate which parts of DAG(s) should be deleted by marking retention roots. To mark a retention root that is not alive, a user may write a special block termed a "searchable deletion root" by assigning it a search key that is identical to the search key of the retention root to be deleted.

For example, referring again to FIG. 1, a deletion root 108 may be associated with retention root SP1 102. A deletion algorithm employed by the secondary storage system may be configured to mark for deletion all blocks that are not reachable from the alive retention roots. For example, in FIG. 1, if a user writes deletion root 108, all blocks with dotted lines, blocks A 106, D 110, B 112, and E 114, are marked for deletion. Note that Block A 106 is also marked for deletion because there is no retention root pointing to it, whereas block F 116 is retained, as it is reachable from the retention root SP2 104. Here, block 104 is alive because it does not have a matching deletion root. During data deletion, there is a short read-only period, in which the system identifies blocks to be deleted. Actual space reclamation may occur in the background during regular read-write operation. Further, before entering a read-only phase, all blocks to be retained should be pointed to by alive retention roots.

Figure 2:
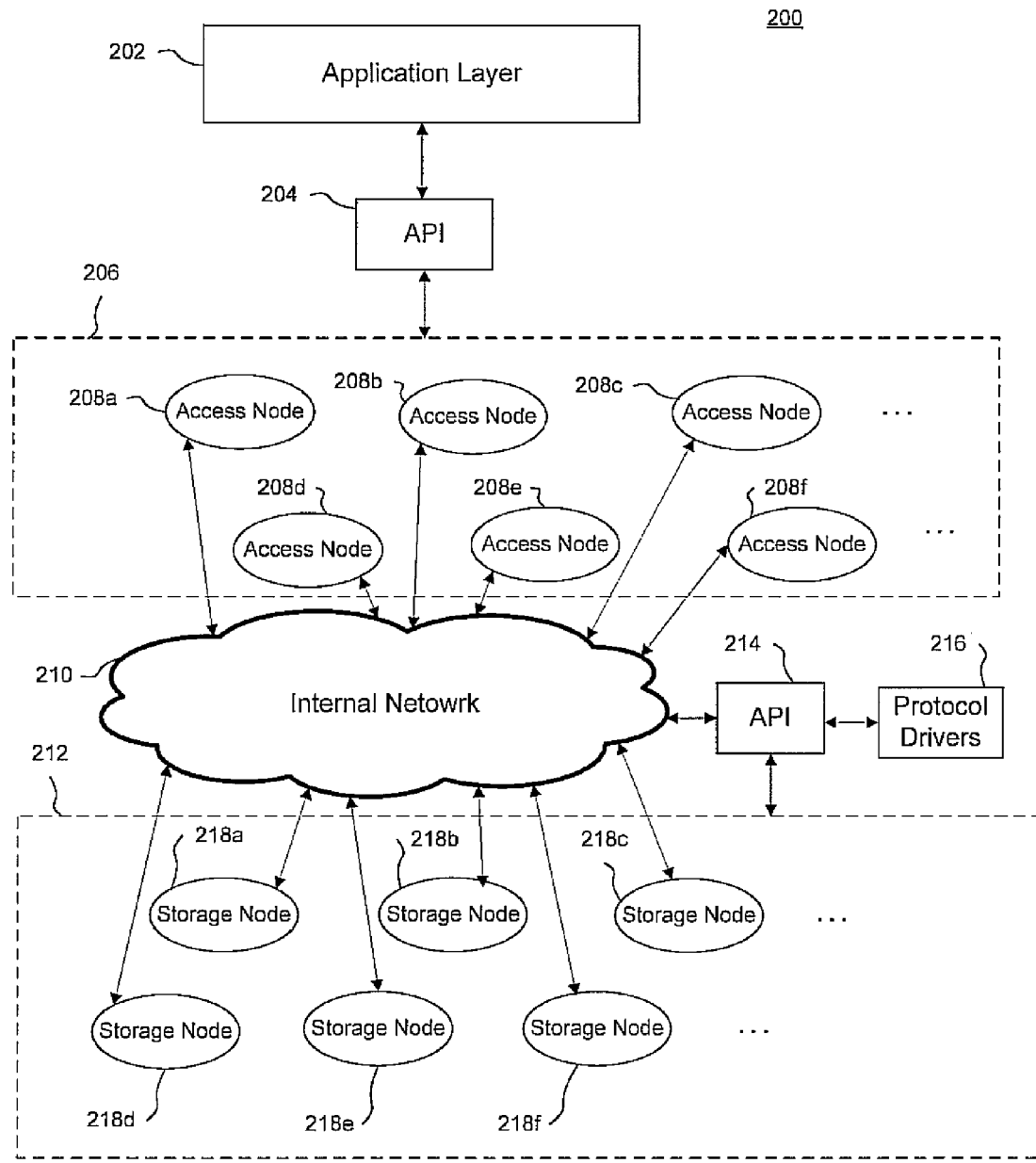
FIG. 2 is a block/flow diagram of a secondary storage system in accordance with one exemplary implementation of the present principles.

With reference now to FIG. 2, illustrating a high-level block/flow diagram of a secondary storage system 200 in accordance with one exemplary embodiment of the present principles that may implement the data organization model and API operations discussed above is illustrated. It should be understood that embodiments described herein may be entirely hardware or including both hardware and software elements. In a preferred embodiment, the present invention is implemented in hardware and software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores the program for use by or in connection with the instruction execution system, apparatus, or device. The medium can be magnetic, optical, electronic, electromagnetic, infrared, or semiconductor system (or apparatus or device). The medium may include a computer-readable medium such as a semiconductor or solid state memory, magnetic tape, a removable computer diskette, a random access memory (RAM), a read-only memory (ROM), a rigid magnetic disk and an optical disk, etc.

Further, a computer readable medium may comprise a computer readable program, wherein the computer readable program when executed on a computer causes the computer to perform method steps disclosed herein and/or embody one or more storage servers on storage nodes. Similarly, a program storage device readable by machine, tangibly embodying a program of instructions executable by the machine may be configured to perform method steps, discussed more fully below, for managing data on a secondary storage system.

System 200 may include an application layer 202 configured to interact with user-inputs and implement user-commands to store, retrieve, delete and otherwise manage data. An API 204 below the Application Layer 202 may be configured to communicate with the Application Layer 202 and to interact with a front end system 206 to institute data management. Front end system 206 may comprise a plurality of Access Nodes 208a-f that may communicate with an internal network 210. In addition, the front end system 206 interacts with a backend system 212 via application programming interface 214, which, in turn, may interact with protocol drivers 216. Backend system 212 may include a grid of storage nodes 218a-f that may be viewed by the application layer as a collection of file systems in a large storage unit. Further, although six storage nodes are shown here for brevity purposes, any number of storage nodes may be provided in accordance with design choice. In exemplary implementations, the number of access nodes may range between one and half of the storage nodes, but the range may vary depending on the hardware used to implement the storage and access nodes. The backend storage nodes may also communicate via an internal network 210.

Figure 3:
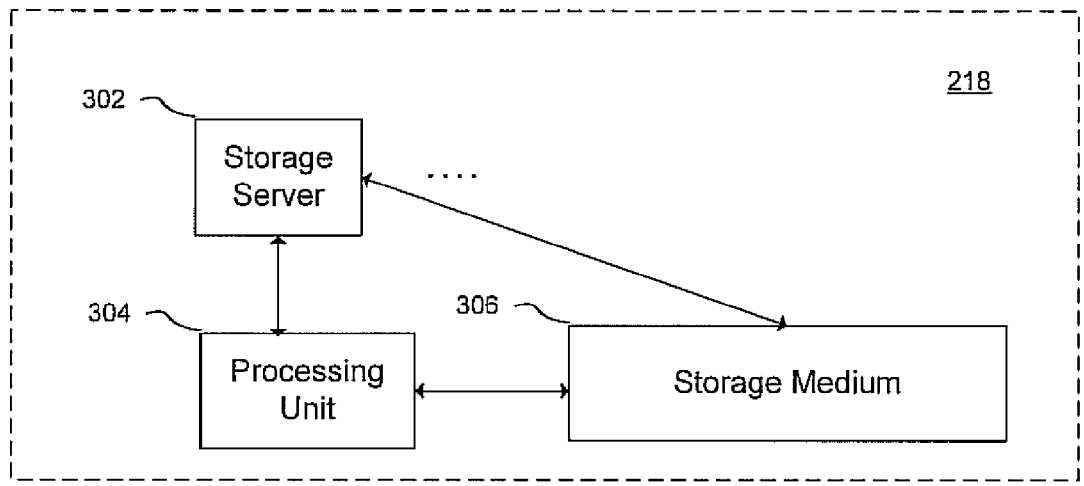
FIG. 3 is a block/flow diagram of a physical storage node in accordance with one exemplary implementation of the present principles.
Figure 4:
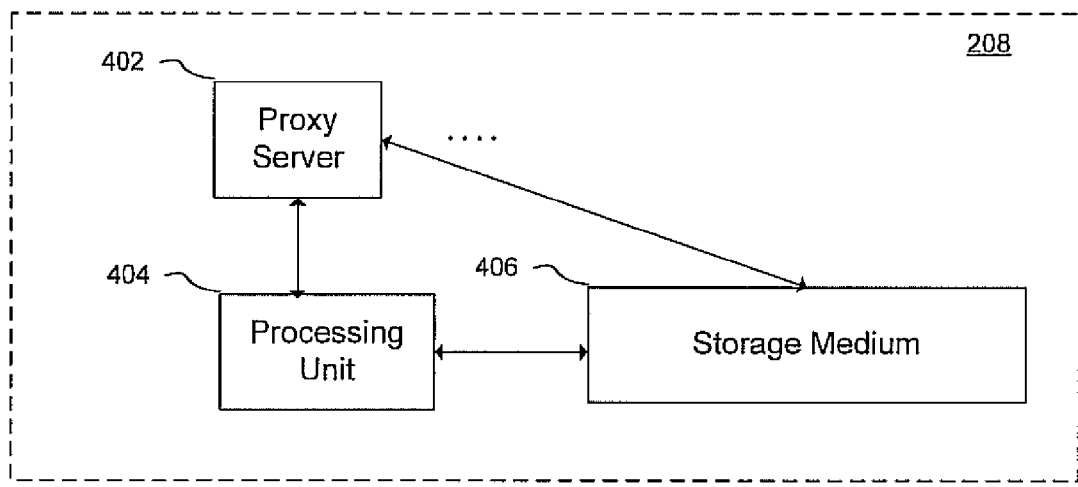
FIG. 4 is a block/flow diagram of an access node in accordance with one exemplary implementation of the present principles.

Referring now to FIGS. 3 and 4 with continuing reference to FIG. 2, an exemplary storage node 218 and an exemplary access node 208 in accordance with embodiments of the present principles are illustrated. A storage node 218 may comprise one or more storage servers 302, a processing unit 304 and a storage medium 306. The storage server may be implemented in software configured to run on processing unit 304 and storage medium 306. Similarly, an access node 208 may comprise one or more proxy servers 402, a processing unit 404 and a storage medium 406. It should be understood that although storage nodes and access nodes are described here as being implemented on separate machines, it is contemplated that access nodes and storage nodes may be implemented on the same machine. Thus, as understood by those of ordinary skill in the art, one machine may simultaneously implement both storage nodes and access nodes.

It should be understood that system 200 may be implemented in various forms of hardware and software as understood by those of ordinary skill in the art in view of the teachings described herein. For example, a suitable system may include storage nodes configured to run one backend storage server and to have six 500 GB SATA disks, 6 GB RAM, two dual-core 3 GHz CPUs and two GigE cards. Alternatively, each storage node may be configured to run two backend storage servers and to have twelve 1 TB SATA disks, 20 GB of RAM, two four-way 3 GHz CPUs and four GigE cards. Further, for example, an access node 208 may include a 6 GB RAM, two dual-core 3 GHz CPUs, two GigE cards and only a small local storage. Moreover, storage and access nodes may also be configured to run Linux, version Red Hat EL 5.1. However, the detailed description of hardware elements should be understood to be merely exemplary, as other configurations and hardware elements may also be implemented by those of ordinary skill in the art in view of the teachings disclosed herein.

Referring again to FIGS. 2-4, as discussed above, components of secondary storage system 200 may include storage servers 302, proxy servers 402 and protocol drivers 216. Further, each storage node 218 may be configured to host one or more storage server 302 processes. The number of storage servers 302 run on a storage node 218 depends on its available resources. The larger the node 218, the more servers 302 should be run. Each server 302 may be configured to be responsible exclusively for a specific number of its storage node's disks. With the use of multicore CPUs, for example, parallelism per storage server 302 may be kept constant with each increase in the number of cores and multiple storage servers may be placed on one storage node.

As discussed above, proxy servers 402 may run on access nodes and export the same block API as the storage servers. A proxy sever 402 may be configured to provide services such as locating backend nodes and performing optimized message routing and caching.

Protocol drivers 216 may be configured to use the API 214 exported by the backend system 212 to implement access protocols. The drivers may be loaded in the runtime on both storage servers 302 and proxy servers 402. Determination of which node to load on a given driver may depend on available resources and driver resource demands. Resource-demanding drivers, such as the file system driver, may be loaded on proxy servers.

A storage server 302 may be designed for multicore CPU use in a distributed environment. In addition, features of storage servers 302 may provide support for parallel development by multiple teams of programmers. Moreover, storage server 302 features may also provide high maintainability, testability and reliability of the resulting system.

To implement storage server 302 features, an asynchronous pipelined message passing framework comprising stations termed "pipelined units" may be employed. Each unit in the pipeline may be single-threaded and need not write-share any data structures with other units. Further, a pipelined unit may also have some internal worker threads. In one exemplary embodiment, pipelined units communicate only by message passing. As such, the pipelined units may be co-located on the same physical node and distributed to multiple nodes. When communicating pipelined units are co-located on the same node, read-only sharing may be used as an optimization. Synchronization and concurrency issues may be limited to one pipelined unit only. Additionally, each pipelined unit may be tested in separation by providing stubs of other pipelined units.

To permit ease of scalability, distributed hash tables (DHTs) may be employed to organize storage locations of data. Because a distributed storage system should include storage utilization efficiency and sufficient data redundancy, additional features of a DHT should be used. For example, the additional features should provide assurances about storage utilization and an ease of integration of a selected overlay network with a data redundancy scheme, such as erasure coding. Because existing DHTs do not adequately provide such features, a modified version of a Fixed Prefix Network (FPN) distributed hash table may be used.

Figure 5:
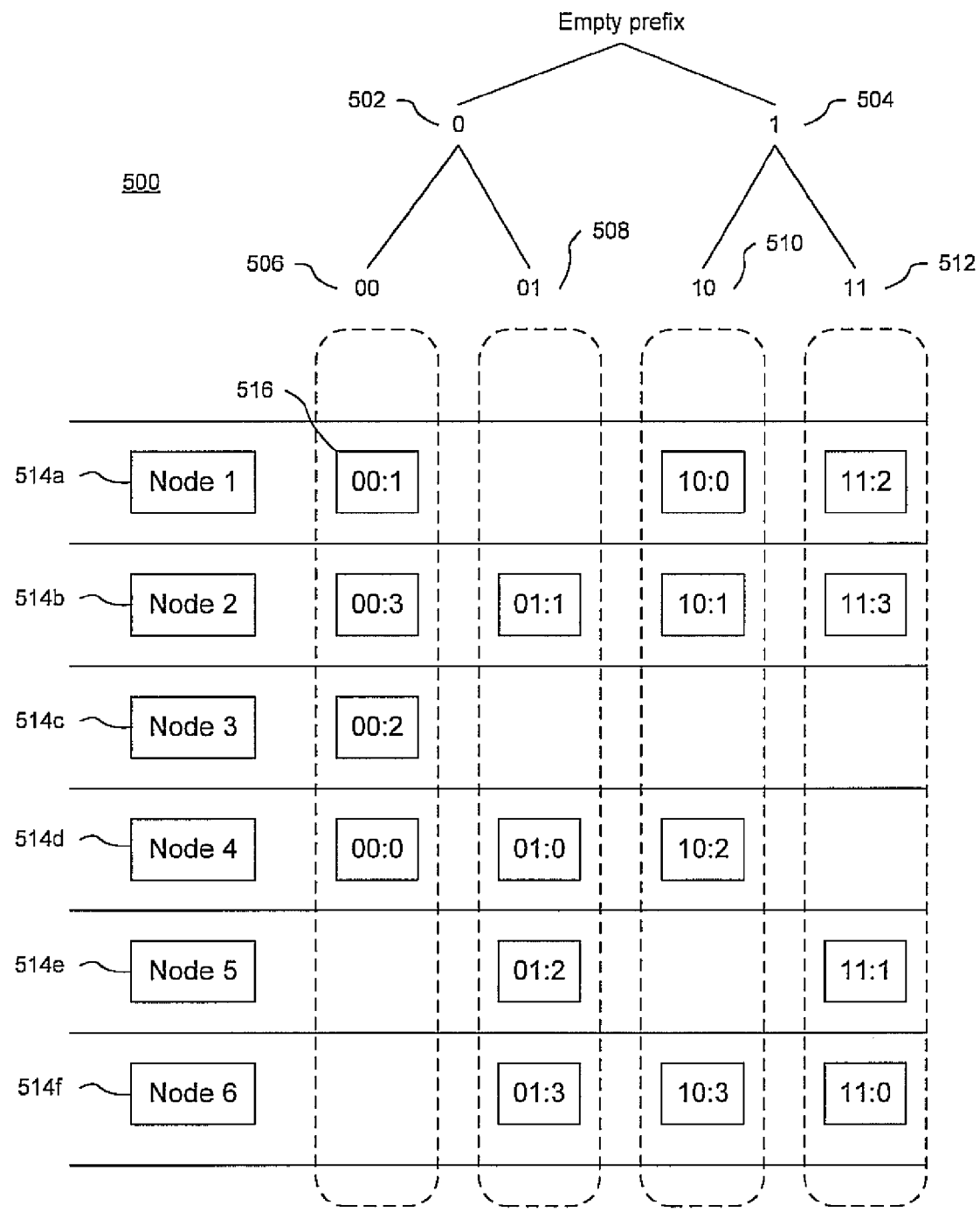
FIG. 5 is diagram of a fixed prefix network indicating the grouping of storage nodes according to hash prefixes of data blocks in accordance with an exemplary embodiment of the present principles.

With reference now to FIG. 5, a representation 500 of a Fixed Prefix Network in accordance with an exemplary embodiment of the present principles is illustrated. In FPNs, each overlay node 502, 504 is assigned exactly one hashkey prefix, which is also an identifier of the overlay nodes. All prefixes together cover the entire hashkey space, and the overlay network strives to keep them disjoint. An FPN node, for example, any one of nodes 506-512, is responsible for hashkeys with a prefix equal to the FPN node's identifier. The upper portion of FIG. 5 illustrates a prefix tree having as leafs four FPN nodes 506-512 dividing the prefix space into four disjoint subspaces.

For a DHT in accordance with aspects of the present principles, an FPN may be modified with "supernodes," as illustrated in FIG. 5. A supernode may represent one FPN node (and as such, it is identified with a hashkey prefix) and is spanned over several physical nodes to increase resiliency to node failures. For example, as illustrated in FIG. 5, if a back-end network includes six storage nodes 514a-514f, each supernode 506-512 may include a fixed number, referred to as a "supernode cardinality," of supernode components 516 which may be placed on separate physical storage nodes 514a-514f. Components of the same supernode are referred to as "peers." Thus, each supernode may be viewed as a subset of storage nodes 514a-514f. For example, supernode 506 may be comprised of a subset 514a-514d of storage nodes. Furthermore, each storage node may be included in a number of supernodes that is less than the total number of supernodes. For example, node 514a may be included in three of the four supernodes, namely supernodes 506, 510 and 512.

In accordance with exemplary implementations of the present principles, the fixed prefix network may be used to assign the storage of data blocks to storage nodes. For example, after hashing data, the first few bits in the hash result, in this example the first two bits, may be used to distribute data blocks to each supernode. For example, data blocks having hash values beginning with "00" may be assigned to supernode 506, data blocks having hash values beginning with "01" may be assigned to supernode 508, data blocks having hash values beginning with "10" may be assigned to supernode 510, and data blocks having hash values beginning with "11", may be assigned to supernode 512. Thereafter, portions of a data block may be distributed between components 516 of the supernode to which it is assigned, as discussed more fully below with respect to FIG. 6. Here, components for supernode 506 are denoted as 00:0, 00:1, 00:2, 00:3. Components for the other supernodes are similarly denoted.

It should be noted that supernode cardinality may, for example, be in the range of 4-32. However, other ranges may be employed. In a preferred embodiment, the supernode cardinality is set to 12. In an exemplary implementation, the supernode cardinality may be the same for all supernodes and may be constant throughout the entire system lifetime.

It should also be understood that supernode peers may employ a distributed consensus algorithm to determine any changes that should be applied to the supernode. For example, after node failure, supernode peers may determine on which physical nodes new incarnations of lost components should be re-created. In addition, supernode peers may determine which alternative nodes may replace a failed node. For example, referring back to FIG. 5, if node 1 514a should fail, component 00:1 may be reconstructed at node 5 514e using erasure coding with data from the other components of supernode 506. Similarly, if node 1 514a should fail, component 10:0 may be reconstructed at node 3 514c using data from the other components of supernode 510. Further, component 11:2 may be reconstructed at node 4 514d using data from the other components of supernode 512.

With regard to read and write handling provided by secondary storage embodiments of the present principles, on write, a block of data may be routed to one of the peers of the supernode responsible for the hashkey space to which this block's hash belongs. Next, the write-handling peer may check if a suitable duplicate is already stored, as discussed more fully below. If a duplicate is found, its address is returned; otherwise the new block is compressed, if requested by a user, fragmented, and fragments are distributed to remaining peers under the corresponding supernode. In accordance with an alternative implementation, deduplication may be performed by hashing a block on an access node and sending only the hash value, without the data, to storage nodes. Here, the storage nodes may determine whether the block is a duplicate by comparing the hash value received from an access node to hash values of stored blocks.

A read request is also routed to one of the peers of a supernode responsible for the data block's hashkey. The peer may first locate the block metadata, which may be found locally, and may send fragment read requests to other peers in order to read the minimal number of fragments sufficient to reconstruct the data block in accordance with an erasure coding scheme. If any of the requests times out, all remaining fragments may be read. After a sufficient number of fragments have been found, the block may be reconstructed, decompressed (if it was compressed), verified and, if successfully verified, returned to the user.

In general, reading is very efficient for streamed access, as all fragments may be sequentially pre-fetched from disk to a local cache. However, determination of fragment location by a peer can be quite an elaborate process. Oftentimes, determination of fragment locations may be made by referencing a local node index and a local cache, but in some cases, for example, during component transfers or after intermittent failures, the requested fragment may be present only in one of its previous locations. In this situation, the peer may direct a distributed search for missing data, by, for example, searching the trail of previous component locations in reverse order.

Another exemplary feature that may be included in secondary storage system embodiments of the present principles is "load balancing," which ensures that components of data blocks are adequately distributed throughout different physical storage nodes of the system. The distribution of components among physical storage nodes improves system survivability, data resiliency and availability, storage utilization, and system performance. For example, placing too many peer components on one machine may have catastrophic consequences if the corresponding storage node is lost. As a result, the affected supernode may not recover from the failure because too many components could not be retrieved. Even if the storage node is recoverable, some or even all of the data handled by an associated supernode may not be readable because of a loss of too many fragments. Also, performance of the system is maximized when components are assigned to physical storage nodes proportionally to available node resources, as the load on each storage node is proportional to the hashkey prefix space covered by the components assigned to the storage node.

Exemplary system implementations may be configured to continuously attempt to balance component distribution over all physical machines or storage nodes to reach a state where failure resiliency, performance and storage utilization are maximized. The quality of a given distribution may be measured by a multi-dimensional function prioritizing these objectives, referred to as system entropy. Such balancing may be performed by each machine/storage node, which may be configured to periodically consider a set of all possible transfers of locally hosted components to neighboring storage nodes. If the storage node finds a transfer that would improve the distribution, such component transfer is executed. In addition, safeguards preventing multiple conflicting transfers happening at the same time may be added to the system. After a component arrives at a new location, its data is also moved from old locations to the new one. The data transfer may be performed in the background, as they may take a long time to execute in some instances.

Load balancing may also be used to manage the addition and removal of storage node machines to/from the secondary storage system. The same entropy function described above may be applied to measure the quality of the resulting component distribution after the addition/removal of machines.

Another important feature of exemplary secondary storage systems is the selection of supernode cardinality, as the selection of supernode cardinality may have a profound impact on properties of a secondary storage system. Firstly, supernode cardinality may determine the maximal number of tolerated node failures. For example, a backend storage network survives storage node failures as long as each supernode remains alive. A supernode remains alive if at least half of each the supernode's peers plus one should remain alive to reach a consensus. As a result, the secondary storage system survives at most half of supernode cardinality minus 1 permanent node failures among physical storage nodes hosting peers of each supernode.

Supernode cardinality also influences scalability. For a given cardinality, the probability that each supernode survives is fixed. Furthermore, probability of survival is directly dependent on the supernode cardinality.

Finally, supernode cardinality may influence the number of data redundancy classes available. For example, erasure coding is parameterized with the maximal number of fragments that can be lost while a block remains still reconstructible. If erasure coding is employed and produces supernode cardinality fragments, the tolerated number of lost fragments can vary from one to supernode cardinality minus one (in the latter case supernode cardinality copies of such blocks may be kept). Each such choice of tolerated number of lost fragments can define a different data redundancy class. As discussed above, each class may represent a different tradeoff between storage overhead, for example, due to erasure coding, and failure resilience. Such overhead may be characterized by the ratio of the tolerated number of lost fragments to the difference between supernode cardinality and the tolerated number of lost fragments. For example, if supernode cardinality is 12 and a block can lose no more than 3 fragments, then the storage overhead for this class is given by the ratio of 3 to (12-3), i.e. 33%.

Figure 6:
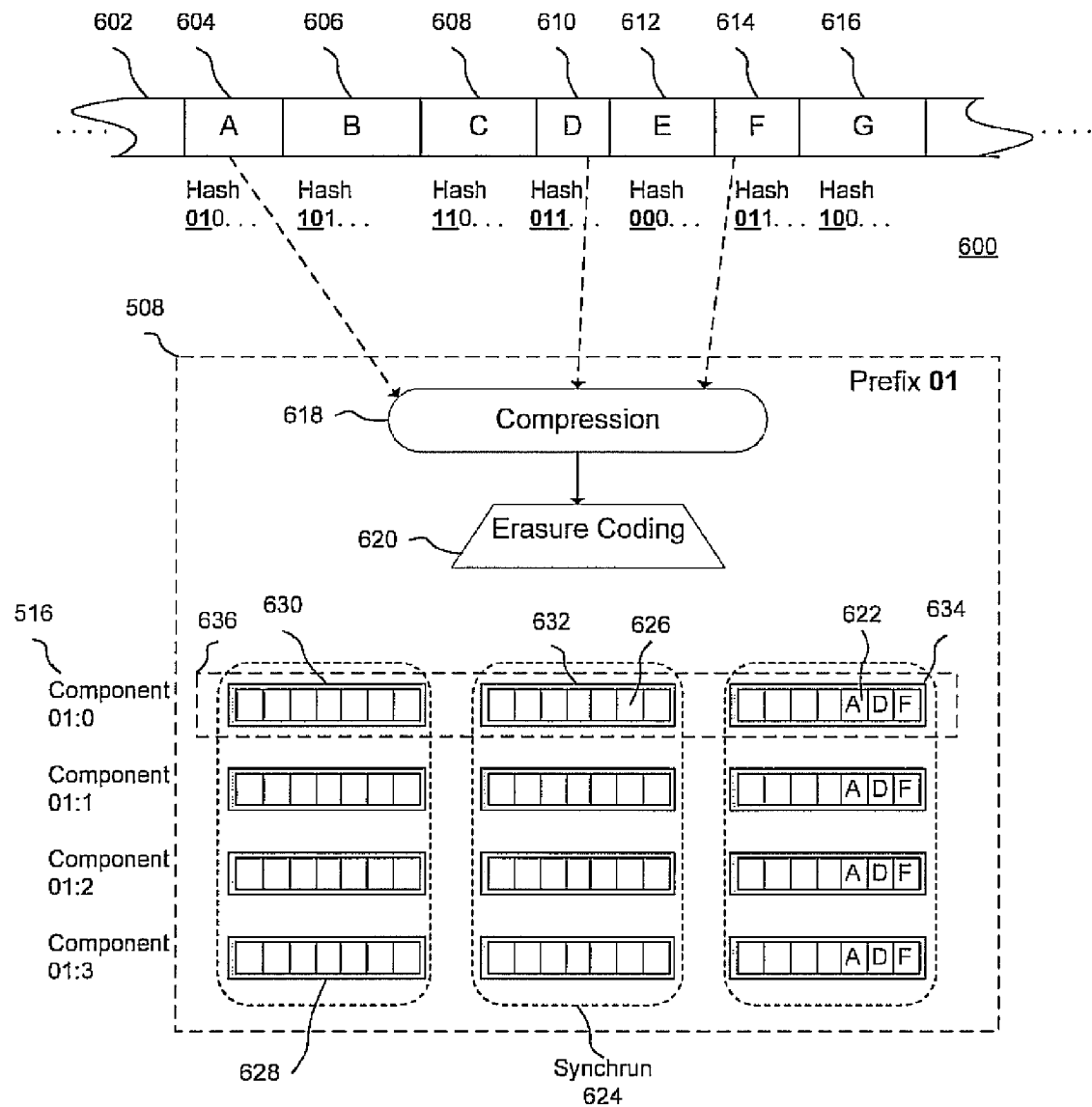
FIG. 6 is a block/flow diagram of a system for distributing data in accordance with one exemplary implementation of the present principles.
Figure 7:
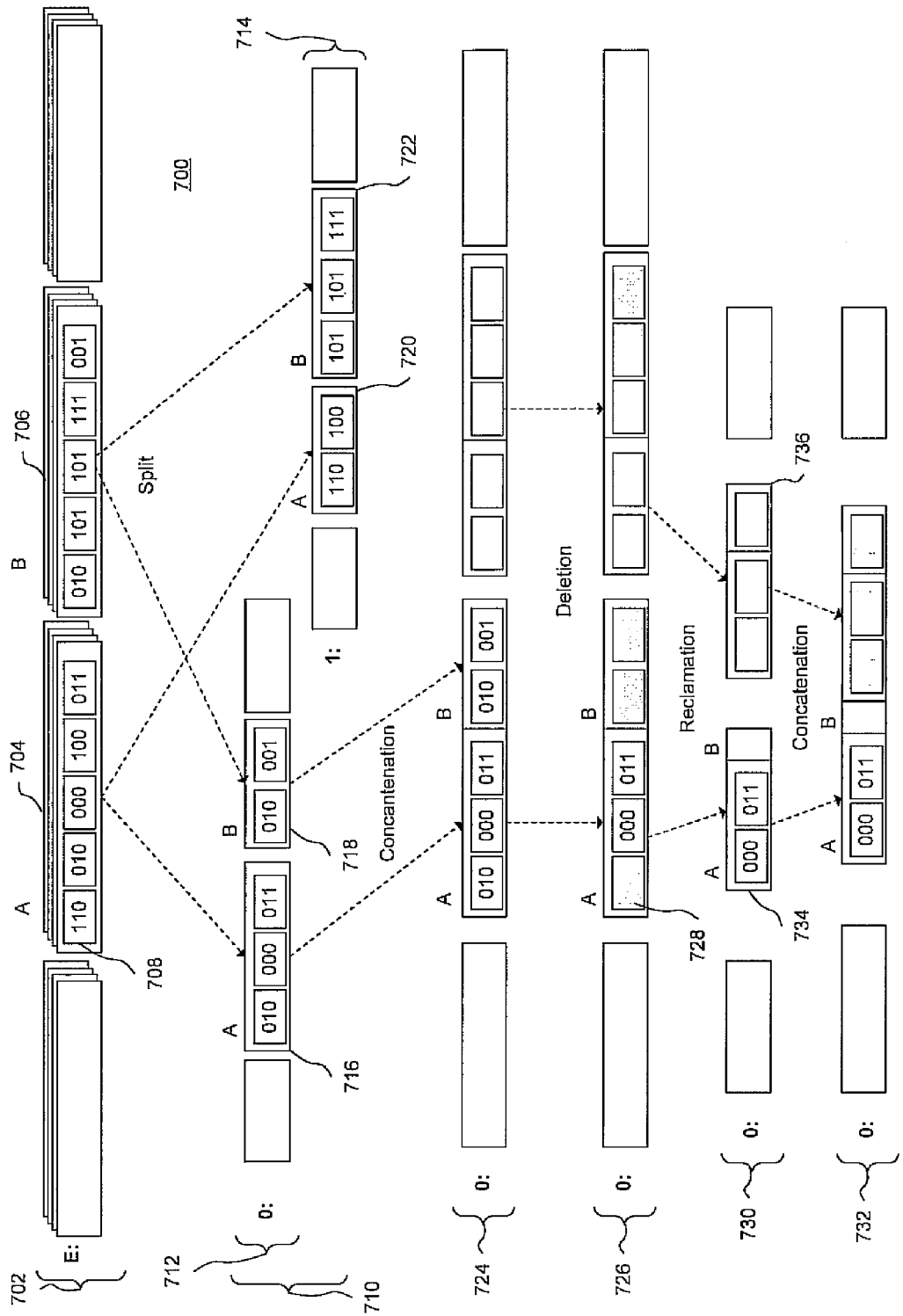
FIG. 7 is a block/flow diagram illustrating splitting, concatenation, and deletion of data and reclamation of storage space in response to addition of storage nodes to a storage node network or loading of additional data in accordance with an embodiment of the present principles.

With reference now to FIGS. 6 and 7, exemplary data organization structures 600, 700 for a secondary storage system using chains of data containers in accordance with an implementation of the present principles is illustrated. The representations 600, 700 of stored data permit a great degree of reliability, availability and performance. Implementations of secondary storage systems using such data organization structures enable fast identification of stored data availability and rebuilding of data to a specified redundancy level in response to a failure. Rebuilding data to a specified redundancy level provides a significant advantage over systems such as RAID, which rebuilds an entire disk even if it contains no valid user data. As discussed below, because data block components move between nodes followed by a data transfer, the system may locate and retrieve data from old component locations, which is much more efficient than rebuilding data. Data blocks written in one stream should be placed close to each other to maximize write and read performance. Further, systems employing data structure implementations described below may also support on-demand distributed data deletion, in which they delete data blocks not reachable from any alive retention root and reclaim the space occupied by the unreachable data blocks.

FIG. 6 illustrates a block/flow diagram of a system 600 for distributing data in accordance with one exemplary implementation of the present principles. As shown in FIG. 6, a data stream 602 including data blocks A 604, B 606, C 608, D 610, E 612, F 614 and G 616 may be subjected to a hash function, such as SHA-1 or any other suitable content addressable storage scheme. As understood by those of ordinary skill in the art, a content addressable storage scheme may apply a hash function on the content of data block to obtain a unique address for the data block. Thus, data block addresses are based on the content of the data block.

Returning to FIG. 6 with continuing reference to FIG. 5, in the example provided, the hash results of data blocks A 604, D 610 and F 616 have prefixes of "01." Thus, blocks A 604, D 610, and F 616 may be assigned to supernode 508. After the hashes for the data blocks are computed from the data stream, the individual data blocks may be compressed 618 and erasure coded 620. As discussed above, erasure coding may be employed to implement data redundancy. Different, resulting erasure code fragments 622 of one data block may be distributed to peer components 516 of the supernode to which the data block is assigned. For example, FIG. 6 illustrates peer components 01:0, 01:1, 01:2 and 01:3 of supernode 508, on which different erasure coded fragments 622 from data blocks with a prefix of "01," namely data blocks A 604, D 610 and F 616, are stored.

A basic logical unit of data management employed by exemplary secondary storage system embodiments is defined herein as a "synchrun," which is a number of consecutive data blocks written by write-handling peer components and belonging to a given supernode. For example, synchrun 624 includes a number of consecutive data block fragments 626 from each component 516 of its corresponding supernode. Here, each fragment may be stored in the order as the blocks appear in the data stream 602. For example, fragments of block F 614 are stored before fragments of block D 610, which, in turn, are stored before fragments of block A 604. Retaining the temporal order eases manageability of the data and permits reasoning about the state of the storage system. For example, retention of temporal order permits a system to determine that data before a certain date is reconstructible in the event of a failure.

Here, writing a block is essentially writing a supernode cardinality of its fragments 622. Thus, each synchrun may be represented by a supernode cardinality of synchrun components, one for each peer. A synchrun component corresponds to the temporal sequence of fragments, for example, fragments 626, which are filtered by the supernode prefix to which the synchrun component belongs. A container may store one or more synchrun components. For the i-th peer of a supernode, the corresponding synchrun component includes all i-th fragments of the synchrun blocks. A synchrun is a logical structure only, but synchrun components actually exist on corresponding peers.

For a given write-handling peer, the secondary storage system may be configured so that only one synchrun is open at any given time. As a result, all such synchruns may be logically ordered in a chain, with the order determined by the write-handling peer. Synchrun components may be placed in a data structure referred to herein as a synchrun component container (SCC) 628. Each SCC may include one or more chain-adjacent synchrun components. Thus, SCCs also form chains similar to synchrun component chains. Further, multiple SCCs may be included in a single peer. For example, peer 01:0 may include SCC 630, SCC 632 and SCC 634. Thus, multiple SCCs ordered on a single peer are referred to as a "peer SCC chain" 636. In addition, a chain of synchruns may be represented by the supernode cardinality of peer SCC chains. A peer chain is illustrated, for example, at rows 724-732 in FIG. 7, which is discussed more fully below.

Peer SCC chains, in general, may be identical with respect to synchrun components/fragments 622 metadata and the number of fragments in each of them, but occasionally there may be differences caused, for example, by node failures resulting in chain holes. This chain organization allows for relatively simple and efficient implementation of data services of a secondary storage system, such as data retrieval and deletion, global duplicate elimination, and data rebuilding. For example, chain holes may be used to determine whether data is available (i.e. all associated blocks are reconstructible). Thus, if a sufficient number of peer chains, which is equal to the number of fragments used to fully reconstruct each block, do not have any holes, then the data is deemed available. If redundancy classes are used, determination of data availability can similarly be made for each redundancy class.

Furthermore, it should be understood that the system may store different types of metadata. For example, metadata for a data block may include exposed pointers to other data blocks, which may be replicated with each fragment of a data block with pointers. Other metadata may include fragment metadata comprising, for example, block hash information and block resiliency information. Fragment metadata may be stored separately from the data and may be replicated with each fragment. In addition, data containers may include metadata related to part of the chain it stores, such as the range of synchrun components the container stores. This metadata held by the containers permits for fast reasoning about the state of data in the system and the performance of data services, such as data building and transfers. Thus, each container includes both data and metadata. As noted above, the metadata may be replicated, whereas a redundancy level of the data requested by a user may be maintained with parameterization of erasure codes. Thus, chains of containers, such as chains of data stored on each of the components/storage nodes in supernode 508, may be deemed redundant in that the multiple chains may exist with identical metadata but different data. Further, the chains of containers may also be deemed redundant because the data itself is in a sense redundant due to the use, for example, of erasure coding to store the data in the different chains.

With reference now to FIG. 7, a data organization structure 700 illustrating splitting, concatenation, and deletion of data and reclamation of storage space in response to an addition of storage nodes in a storage node network and/or an addition of data stored in the storage nodes in accordance with an embodiment of the present principles is illustrated. Row 702 shows two synchruns A 704 and B 706, both belonging to an empty prefix supernode covering the entire hashkey space. Each synchrun component is placed here in one SCC, with individual fragments 708 also shown. SCCs with synchrun components of these synchruns are shown as rectangles placed one behind the other. As stated above, a chain of synchruns may be represented by the supernode cardinality of peer chains SCC chains. In the remainder of the FIG. 7 only one such peer SCC chain is shown.

According to an embodiment of the present principles, each supernode may eventually be split in response to, for example, loading data or adding physical storage nodes. For example, the split, as shown in row 710, may be a regular FPN split and may result in two new supernodes including respective supernode SCC chains 712 and 714, with prefixes extended from the ancestor prefix with, respectively, 0 and 1. After the supernode split, each synchrun in each supernode may also be split in half, with fragments distributed between them based on their hash prefixes. For example, row 710 shows two such chains, one chain 712 for the supernode with the prefix 0, and the other chain 714 for the supernode 714 with the prefix 1. Note that, as a result of the split, fragments 708 of synchruns A 704 and B 706 are distributed among these two separate chains, 712 and 714, which may be stored on separate storage nodes under different supernodes. As a result, four synchruns, 716, 718, 720 and 722 are created, but each of the new synchruns 716, 718 and 720, 722 are approximately half the size of the original synchruns 704 and 706, respectively.

Further, it should be understood that when a physical storage node is added to a secondary storage system and the system responds by splitting supernodes, the system may be configured to assign physical storage nodes to both new and old supernodes in a manner similar to that described above with regard to FIG. 5. For example, the secondary storage system may evenly distribute physical storage nodes among all supernodes.

In accordance with another exemplary feature of an embodiment of the present invention, a secondary storage system may maintain a limited number of local SCCs. For example, the number of SCCs may be maintained by merging or concatenating adjacent synchrun components into one SCC, as illustrated in row 724 of FIG. 7, until maximum size of the SCC is reached. Limiting the number of local SCCs permits storing SCC metadata in RAM, which in turn enables fast determination of actions to provide data services. The target size of an SCC may be a configuration constant, which may be set below 100 MB, for example, so multiple SCCs can be read in the main memory. SCC concatenations may be loosely synchronized on all peers so that peer chains maintain a similar format.

Continuing with FIG. 7, deletion of data is illustrated in row 726 of FIG. 7 in which shaded data fragments are deleted. Subsequently, as shown in rows 730 and 732, respectively, storage space may be reclaimed and remaining data fragments of separate SCCs may be concatenated. The deletion service is described more fully below.

The data organizations described above with respect to FIGS. 6 and 7 are relatively simple to implement in a static system, but are quite complex in a dynamic backend of a secondary storage system. For example, if a peer is transferred to another physical storage during load balancing, its chains may be transferred in the background to a new location, one SCC at a time. Similarly, in accordance with exemplary embodiments, after a supernode split, not all SCCs of the supernode are split immediately; instead a secondary storage system may run background operations to adjust chains to the current supernode locations and shape. As a result, in any given moment, chains may be partially-split, partially present in previous locations of a peer, or both. In the event of one or more physical storage node failures, substantial holes may be present in some of SCC chains. Because peer chains may describe the same data due to the supernode cardinality chain redundancy in the system, a sufficient number of complete chains should be present to enable data reconstruction. Accordingly, chain redundancy permits deductions about the data in the system even in the presence of transfers/ failures.

Based on data organization structures described above, secondary storage system embodiments of the present principles may efficiently deliver data services such as determining recoverability of data, automatic data rebuilding, load balancing, deletion and space reclamation, data location, deduplication and others.

With regard to data rebuilding, in the event of a storage node or disk failure, SCCs residing thereon may be lost. As a result, if redundancy levels are employed, the redundancy of the data blocks with fragments belonging to these SCCs is at best reduced to a redundancy level below that requested by users when writing these blocks. In the worst case scenario, a given block may be lost completely if a sufficient number of fragments do not survive. To ensure that the block redundancy is at the desired levels, the secondary storage system may scan SCC chains to search for holes and schedule data rebuilding based on an erasure coding scheme, for example, as background jobs for each missing SCC.

In accordance with an exemplary embodiment, multiple peer SCCs may be rebuilt in one rebuilding session. Based on SCC metadata, for example, a minimal number of peer SCCs used for data rebuilding is read by a peer performing the rebuilding. Thereafter, erasure coding and decoding are applied to them in bulk to obtain lost fragments which will be included in a rebuilt SCC(s). Rebuilt SCCs may be configured to have the same format by performing any splits and concatenations, which permits fast bulk rebuilding. Next, the rebuilt SCCs may be sent to current target locations.

Another service that may be performed by secondary storage system embodiments includes duplicate elimination, which can be decentralized across storage nodes and which can be configured in many different dimensions. For example, the level at which duplicates are detected, such as an entire file, a subset of a file, a fixed-size block or a variable-size block, may be set. In addition, the time when the deduplication is performed, such as online, when a duplicate is detected before it is stored, or in the background after it reaches the disk may be set. The accuracy of depduplication may be adjusted. For example, the system may be set to detect each time a duplicate of an object being written is present, which may be termed "reliable," or the system may approximate the presence of duplicate files at a gain of faster performance, which may be termed "approximate." The manner in which equality of two objects is verified may be also be set. For example, the system may be configured to compare secure hashes of two object contents or, alternatively, to compare the data of these objects directly. Further the scope of detection may be varied in that it can be local, restricted only to data present on a given node, or global, in which all data from all nodes is used.

In a preferred embodiment, a secondary storage system implements a variable-sized block, online, hash-verified global duplicate elimination scheme on storage nodes. Fast approximate deduplication may be used for regular blocks, whereas reliable duplicate elimination may be used for retention roots to ensure that two or more blocks with the same search prefix point to the same blocks. In both cases, if redundancy classes are employed, the potential duplicate of a block being written should have a redundancy class that is not weaker than the class requested by the write and the potential old duplicate should be reconstructible. Here, a weaker redundancy class indicates a lower redundancy.

On a regular block write, the search for deduplicate files may be conducted on a peer handling a write request and/or a peer that has been alive the longest. For example, the peer handling the write may be selected based on the hash of the block so that two identical blocks written when this peer is alive will be handled by it. Thus, the second block may be easily determined to be a duplicate of the first block in the peer. A more complicated situation arises when the write-handling peer has been recently created due to a data transfer or component recovery and the peer does not yet have all the data it should have in that its local SCC chain is incomplete. In such a case, the peer that has been alive the longest in the same supernode as the write-handling peer is examined to check for possible duplicates. While checking the longest-alive peer is just a heuristics measure, it is unlikely that the longest-alive peer will not have its proper SCC chain complete, as this typically occurs after massive failures. Moreover, for a particular block, even in the case of a massive failure, only one opportunity to eliminate a duplicate is missed; the next identical block should be duplicate-eliminated.

For writes on retention roots, the secondary storage system should ensure that two blocks with the same search prefix point to the same blocks. Otherwise, retention roots will not be useful in identifying snapshots. As a result, an accurate, reliable duplicate elimination scheme should be applied for retention roots. Similar to writes to regular blocks, the peer handling the write may be selected based on the hash of the block so that any duplicates will be present on the peer. However, when a local full SCC chain does not exist at the peer handling a write, the write-handling peer may send duplicate elimination queries to all other peers in its supernode. Each of these peers checks locally for a duplicate. A negative reply may also include a summary description of parts of the SCC chain on which the reply is based. The write handling peer may collect all replies. If there is at least one positive, a duplicate is found. Otherwise, when all are negative, the write-handling peer may attempt to build the full chain using any chain information attached to negative replies. If the entire SCC chain can be built, the new block is determined to not be a duplicate. Otherwise, the write of the retention root may be rejected with special error status indicating that data rebuilding is in progress, which may happen after a massive failure. If the entire chain cannot be covered, the write should be submitted later.

Another data service that may be performed by secondary storage system embodiments includes data deletion and storage space reclamation. As noted above, an exemplary secondary storage system may include features such as content-addressability, distribution and failure tolerance, and duplicate elimination. These features raise complex problems in implementing data deletion. While deletion in content-addressable system embodiments is somewhat similar to distributed garbage collection, which is well understood, there are substantial differences, as discussed herein below.

When deciding if a block is to be duplicate-eliminated against another old copy of the block, exemplary secondary storage system embodiments should ensure that the old block is not scheduled for deletion. A determination on which block to keep and which to delete should be consistent in a distributed setting and in the presence of failures. For example, a deletion determination should not be temporarily lost due to intermittent failures, as duplicate blocks that are scheduled for deletion may be eliminated. Moreover, robustness of a data deletion algorithm should be higher than data robustness. This property is desirable because, even if some blocks are lost, data deletion should be able to logically remove the lost data and repair the system when such action is explicitly requested by a user.

To simplify the design and make the implementation manageable in exemplary embodiments of secondary storage systems, deletion may be split in two phases: a read-only phase, during which blocks are marked for deletion and users cannot write data; and a read-write phase, during which blocks marked for deletion are reclaimed and users can issue both reads and writes. Having a read-only phase simplifies deletion implementation, as it eliminates the impact of writes on the block-marking process.

Referring again to FIG. 7, deletion may also be implemented with a per-block reference counter configured to count the number of pointers in system data blocks pointing to a particular block. In certain implementations, reference counters need not be updated immediately on write. Instead, they may be updated incrementally during each read-only phase, during which the secondary storage system processes all pointers written since the previous read-only phase. For each detected pointer, the reference counter of the block to which it points is incremented. After all pointers are detected and incrementation is completed, all blocks with a reference counter equal to zero may be marked for deletion. For example, as illustrated in FIG. 7, fragments 728 may be included in data blocks marked for deletion. Moreover, reference counters of blocks pointed to by blocks already marked for deletion (including roots with associated deletion roots) may be decremented. Thereafter, any blocks with reference counters equal to zero due to a decrement may be marked for deletion and reference counters of blocks pointed to by blocks already marked for deletion may be decremented. The marking and decrementing process may be repeated until no additional blocks can be marked for deletion. At this point, the read-only phase may end and blocks marked for deletion can be removed in the background.

The exemplary deletion process as described above uses metadata of all blocks as well as all pointers. The pointers and block metadata may be replicated on all peers, so the deletion can proceed even if some blocks are no longer reconstructible, as long as at least one block fragment exists on a peer.

Because blocks may be stored as fragments, a copy of the block reference counter may be stored for each fragment. Thus, each fragment of a given block should have the same value of the block's reference counter. Reference counters may be computed independently on peers participating in the read-only phase. Before deletion is initiated, each such peer should have an SCC chain that is complete with respect to fragment metadata and pointers. Not all peers in a supernode need to participate, but some minimal number of peers should participate to complete the read-only phase. Computed counters may be later propagated in the background to remaining peers.

Redundancy in counter computation permits any deletion determinations to survive physical storage node failures. However, the intermediate results of deletion computations need not be persistent. In certain exemplary embodiments, any intermediate computation results may be lost due to storage node-failure. If a storage node fails, the whole computation may be repeated if too many peers can no longer participate in the read-only phase. However, if a sufficient number of peers in each supernode were not affected by a failure, deletion can still continue. Upon conclusion of a read-only phase, the new counter values are made failure-tolerant and all dead blocks (i.e., blocks with reference counters equal to zero) may be swept from physical storage in background. For example, dead blocks may be swept as illustrated in row 730 of FIG. 7.

Referring now to FIGS. 8, 9 and 10*a*-10*c* and continuing reference to FIGS. 2, 3, 5 and 6, a method 800 and systems 200, 600 for managing data on a secondary storage system in accordance with exemplary implementations of the present principles are illustrated. It should be understood that each of the features discussed above, taken individually or in any combination, of exemplary secondary storage systems may be implemented in method 800 and in systems 200 and 600. Thus, the features of method 800 and in systems 200 and 600 discussed herein below are merely exemplary and it is contemplated that the features discussed above may be added to method and system implementations as understood by those of ordinary skill in the art in view of the teaching provided herein.

Method 800, at step 801, may optionally include applying a hash function on an incoming stream of data blocks, as described, for example, above with respect to FIG. 6. For example, a SHA-1 hash function may be employed.

Optionally, at step 802, the data blocks may be erasure coded, for example, as described above with respect to block 620 of FIG. 6.

At step 804, the data blocks may be distributed to different containers located in a plurality of different physical storage nodes in a node network to generate redundant chains of data containers in the nodes, for example, as described above with respect to FIG. 6. For example, the distributing may comprise storing the erasure coded fragments 622 in different data containers 628 such that fragments originating from one of the data blocks, for example, data block A 604, are stored on different storage nodes. For example, the different storage nodes may correspond to nodes 514*b* and 514*d-f* in FIGS. 5 and 6, which are under supernode 508. Further, as stated above, the fragments of data blocks may be content-addressed on a storage medium of a storage node. In addition, it should be noted that different prefixes of content addresses may be associated with a different subset of storage nodes. For example, as discussed above with respect to FIGS. 5 and 6, hash key prefixes may be associated with different supernodes 506-512, each of which may span a plurality of storage nodes. Furthermore, each of the chains of data containers corresponding to a supernode may include the same metadata describing data block information such as, for example, hash value and resiliency level, as discussed above. In addition, the metadata may include exposed pointers between data blocks in the data containers, as stated above.

At step 806, an addition of active storage nodes to the storage node network may be detected by one or more storage nodes. For example, an explicit addition or removal of one or more storage nodes may be detected by a peer component by receiving an administration command indicating the additions and/or removals.

At step 808, at least one chain of containers may be split in response to detecting the addition of active storage nodes. For example, one or more chains of containers may be split as described above with respect to rows 702 and 710 in FIG. 7. It should be understood that the splitting may comprise splitting one or more data containers 628 and/or splitting one or more data container/synchrun chains 636. For example, splitting a chain of data containers may comprise separating at least one data container from the chain of containers. In addition, the metadata may be referenced during container chain splitting to permit, for example, the maintenance of a desired redundancy level or to conduct load balancing in response to one or more added nodes. In addition, it should also be noted that automatic splitting may comprise extending at least one prefix of content addresses to generate new supernodes or subsets of storage nodes, for example, as described above with respect to FIG. 7.

At step 810, at least a portion of data split from at least one chain of container may be transferred from one of storage node to another storage node to enhance system robustness against node failures. For example, as discussed above with respect to FIG. 7, data block fragments stored in containers of a chain of SCCs may be split and distributed to different supernodes. As stated above, different supernodes may include different storage node components; as such, a transfer from one supernode or subset of nodes to another supernode or subset of nodes may comprise a transfer between different storage nodes. As discussed above, the split may be performed in response to an addition of new storage nodes to the secondary storage system. Thus, generation of new supernodes and data distribution between them permits effective utilization of storage nodes in the network such that the storage of data is diversified, thereby providing robustness against one or more node failures. The wide availability of redundant data on different storage nodes facilitates data reconstruction in the event of a failure.

At step 812, at least one data container may be merged with another data container. For example, as discussed above, with respect to FIG. 7, synchruns 716 and 720, which include data containers, may be merged with synchruns 718 and 722, respectively, which also include data containers, after a split to, for example, maintain a certain number of SCCs. Furthermore, merging may also be performed after deletion and reclamation, for example, as discussed above with respect to rows 726, 730 and 732 of FIG. 7.

Figure 9:
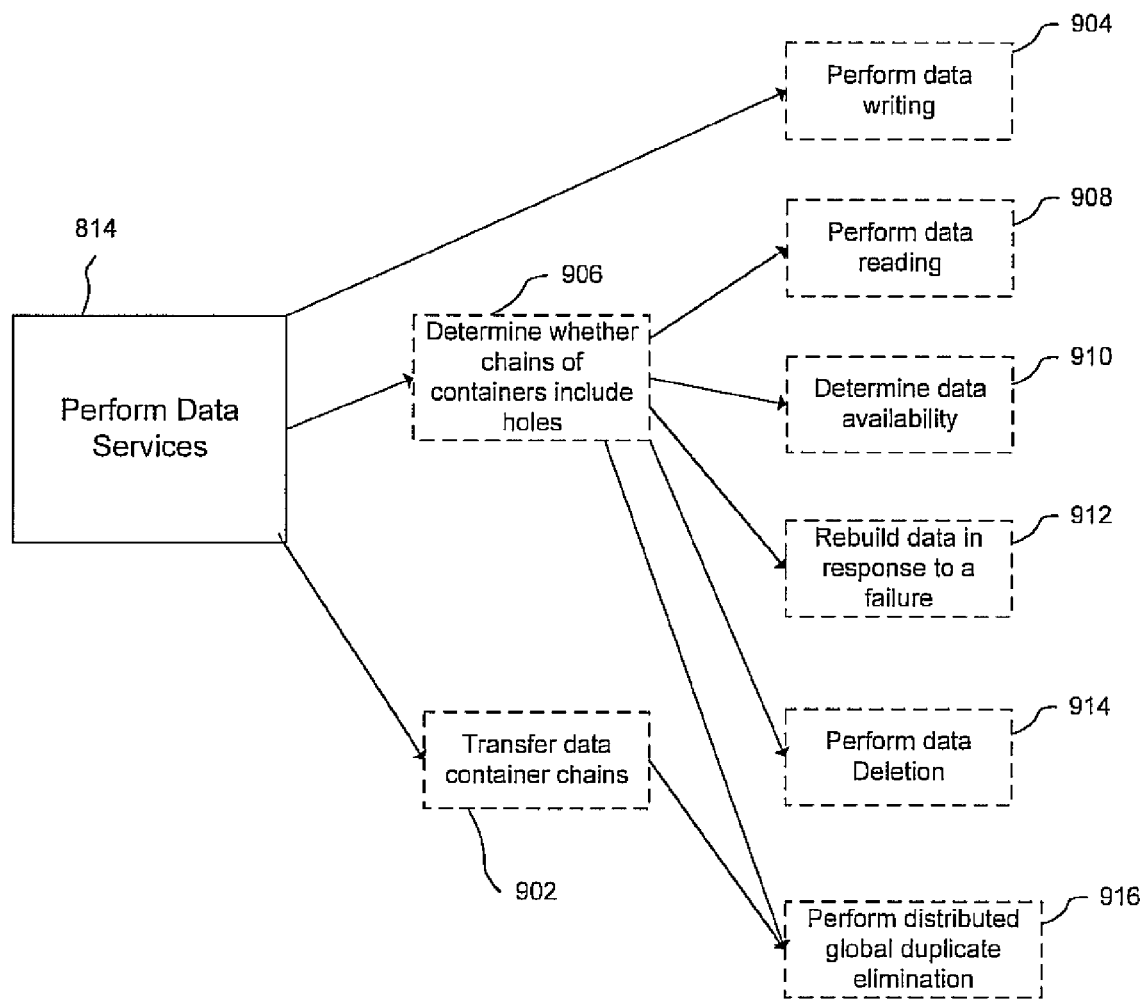
FIG. 9 is a block/flow diagram illustrating a plurality of data services that may be performed by a secondary storage system in accordance with one exemplary implementation of the present principles.

During performance of any portion of method 800, one or more data services may also be performed at step 814. Although step 814 is shown at the end of method 800, it may be performed during, between or after any other steps of method 800. For example, the method may be performed to aid in implementation of data services, such as load balancing. As illustrated in FIG. 9, performance of data services may comprise transferring 902 data container chains from one storage node or supernode component to another storage node or supernode component. The organization of peer chains in accordance with temporal order facilitates transfer of data container chains.

At steps 904 and 908, data writing and reading may be performed. For example, as discussed above, during a write, a block of data may be routed to one of the peers of a supernode assigned to a hashkey space to which the block belongs. In addition, duplicate detection may also be performed on a write. With respect to reads, for example, as discussed above, a read request may also be routed to one of the peers of a supernode responsible for the data block's hashkey. Reading a block may comprise reading block metadata and transferring fragment read requests to other peers to obtain a sufficient number of fragments to reconstruct the block in accordance with an erasure coding scheme, as discussed above.

At step 906, it may be determined whether chains of data containers include holes. Identification of holes in dsta container chains facilitates, for example, data reading, determination of data availability, performing data deletion, rebuilding data in response to a failure, and performing distributed global duplicate elimination. For example, identification of holes indicates that data fragments stored in a container are unavailable. As a result, a storage server should search another peer for other data fragments during reconstruction or rebuilding of data. Rebuilding of data may, for example, be triggered by a data read. Similarly, identification of holes may be performed during a system test for whether a user-defined redundancy level is maintained on the system.

Figure 10A:
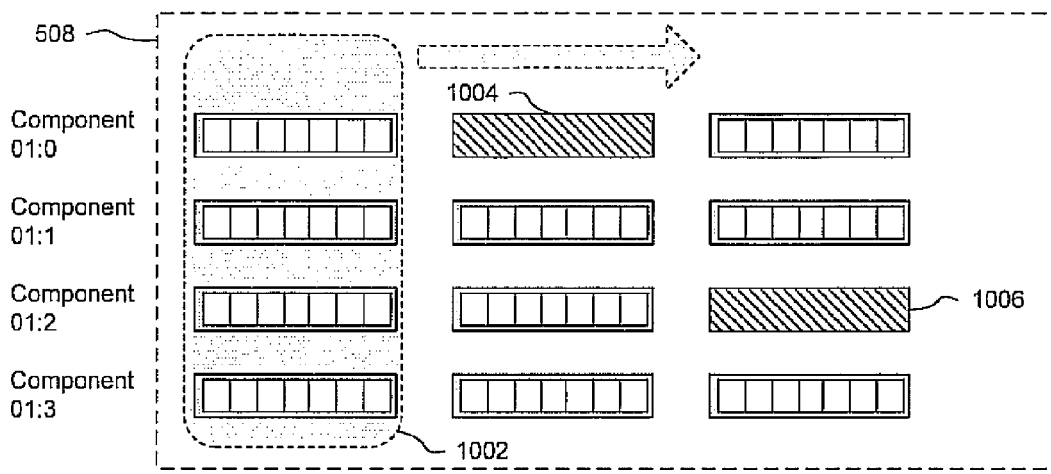
FIGS. 10A-10C are block/flow diagrams illustrating different time frames during a scanning operation for detecting holes in chains of data containers in accordance with an exemplary implementation of the present principles.
Figure 10B:
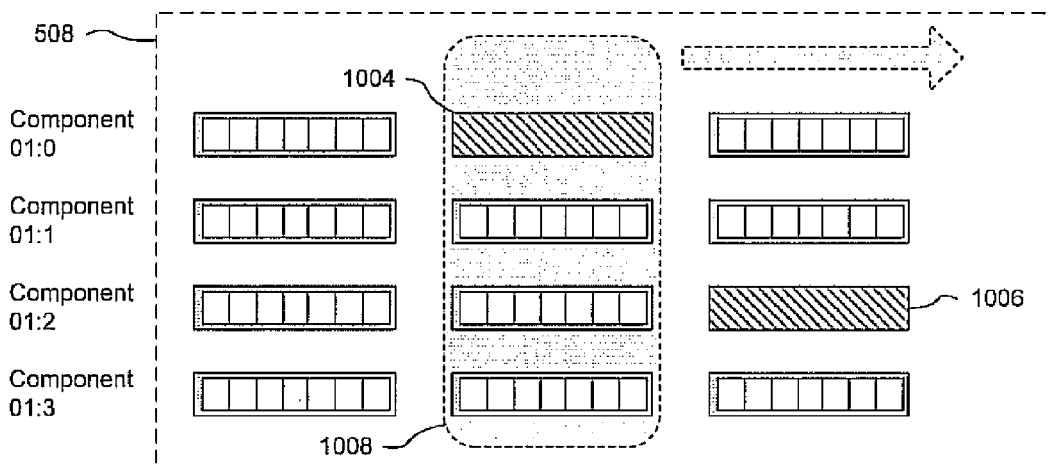
Figure 10C:
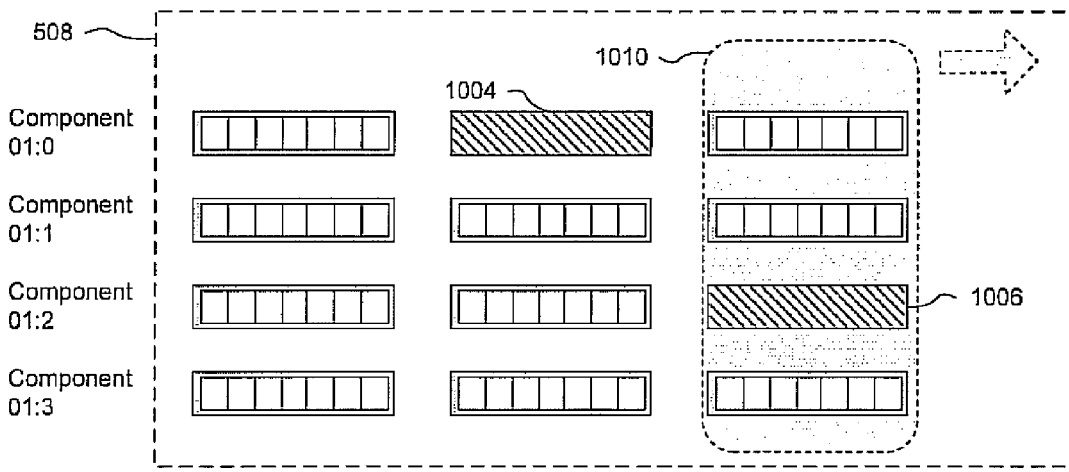

One example in which a storage server may determine whether chains of containers include holes is illustrated in FIGS. 10A-10C, indicating different time frames of a synchrun chain scan on peers of a supernode. For example, in FIG. 10A, a storage server may be configured to scan a synchrun 1002 simultaneously on all peers belonging to supernode 508. In FIG. 10B, the system may proceed to scan the next synchrun 1008 in the temporal order of a stream of data blocks simultaneously on all peers belonging to supernode 508 and discover a hole 1004. Similarly, in FIG. 10C, the system may proceed to scan the next synchrun 1010 in the temporal order of a stream of data blocks simultaneously on all peers belonging to supernode 508 and discover a hole 1006. In this way, chain holes resulting from node and disk failures may be detected, for example. Further, the chain may be rebuilt using chain and data redundancy, as discussed above.

Returning to FIG. 9, determination of data availability may be performed, as mentioned above, at step 910. In addition, rebuilding of data in response to a storage node failure may also be performed at step 912. For example, as discussed above, the system may scan SCC chains to look for holes and schedule data rebuilding as background jobs for each missing SCC. Further, the rebuilding may be performed by referencing fragment metadata and/or container metadata, discussed above.

At step 914, data deletion may be performed. For example, data deletion may be performed on-demand and/or in relation to deduplication, as discussed above. In addition, data deletion may, for example, comprise using a reference counter and iteratively deleting any blocks that do not have any pointers pointing to it. The pointers may be obtained by referencing fragment metadata, for example.

At step 916, distributed global duplicate elimination may be performed, as discussed at length above. For example, as discussed above, fast approximate deduplication may be performed for regular blocks while a reliable deduplication may be performed for retention roots. Moreover, duplicate eliminate may be performed online as a part of data writing.

It should be understood that all services described in FIG. 9 are optional, but a preferable system includes the capability to perform all the services mentioned with respect to FIG. 9. In addition, although steps 902 and 906 are shown as being performed before steps 908-916, any of steps 908-916 may be executed without performing any one or more of steps 902 and 906.

Furthermore, returning to FIGS. 2 and 3, it should be understood that storage servers running on storage nodes in the backend of system 200 may be configured to perform any one or more of the steps described above with respect to FIGS. 8 and 9. Thus, the description provided below of the backend of system 200 should be understood to be exemplary only, and any one or more of the features discussed above may be included therein.

As mention above, the backend 212 of system 200 may include a network of physical storage nodes 218a-218f. In addition, each storage node may include a storage medium and a processor, where the storage medium may be configured to store fragments of data blocks in a chain of data containers that is redundant with respect to chains of data containers in other storage nodes. For example, as discussed above with respect to FIG. 6, fragments 622 of data blocks 604, 610 and 616 may be stored in a chain of data containers 636 in peer 01:0 that is redundant with respect to chains of containers stored in other peers 01:1-01:3.

Further, each storage server 302 may be configured to perform steps 806, 808 and 810, discussed above with respect to FIG. 8. In addition, each storage server may be configured to perform any of the data services discussed with respect to FIG. 9. Moreover, as discussed above, one or more chains chains of data containers may include the same metadata as other chains of data containers. The metadata may describe the state of data in the storage node. Also, as discussed above, a storage server may reference the metadata to automatically split at least one chain of containers on a storage medium associated with the storage server. Furthermore, as stated above, metadata may include exposed pointers between data blocks in the data containers and a storage server may be configured to perform data deletion using the pointers.

As described above with respect to step 801 and FIG. 6, data blocks and their corresponding fragments may be content-addressed based on a hash function. Similarly, the prefixes of hash keys may be associated with different supernodes or subsets of storage nodes. For example, as shown in FIG. 5, the prefix "00" may be associated with a subset of storage nodes 514a-514d, the prefix "01" may be associated with the subset of storage nodes 514b and 514d-f, etc. Moreover, as described above with respect to step 808, automatically splitting a chain of containers may include extending at least one of the prefixes to generate at least one additional subset of storage nodes. For example, as discussed above, if a supernode assigned prefix were "01," the supernode may be split into two supernodes with assigned prefixes of "010" and "011," respectively. In addition, each of the new supernodes may include new and different sets of components or peers or subsets of storage nodes associated therewith. Further, as discussed above with respect to step 810, the transfer instituted by a storage server may comprise distributing at least a portion of data split from the one or more chain of containers to the newly generated or additional subset of storage nodes.

Figure 8:
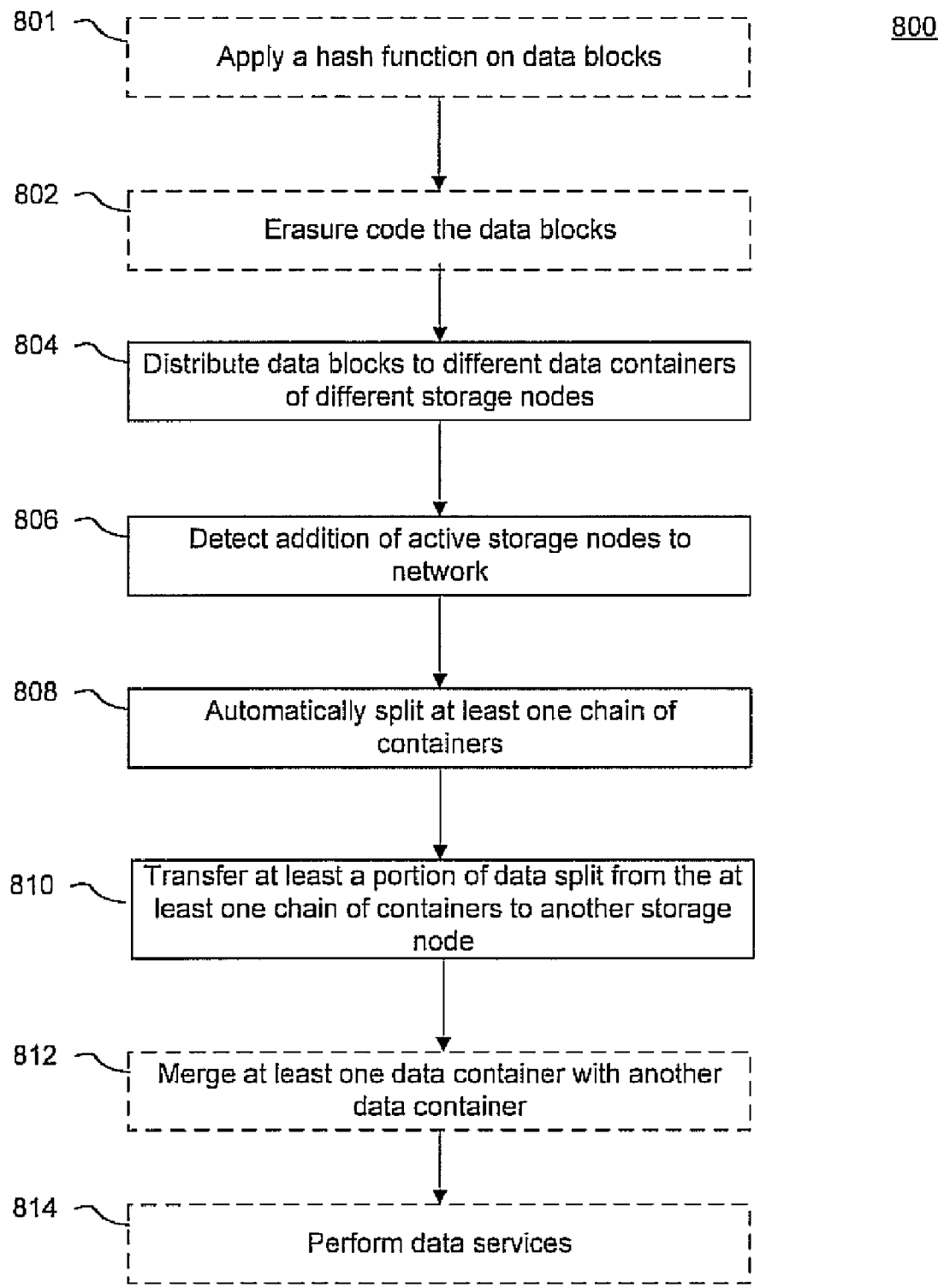
FIG. 8 is a block/flow diagram of a method for managing data in a secondary storage system in accordance with an exemplary implementation of the present principles.
Figure 11:
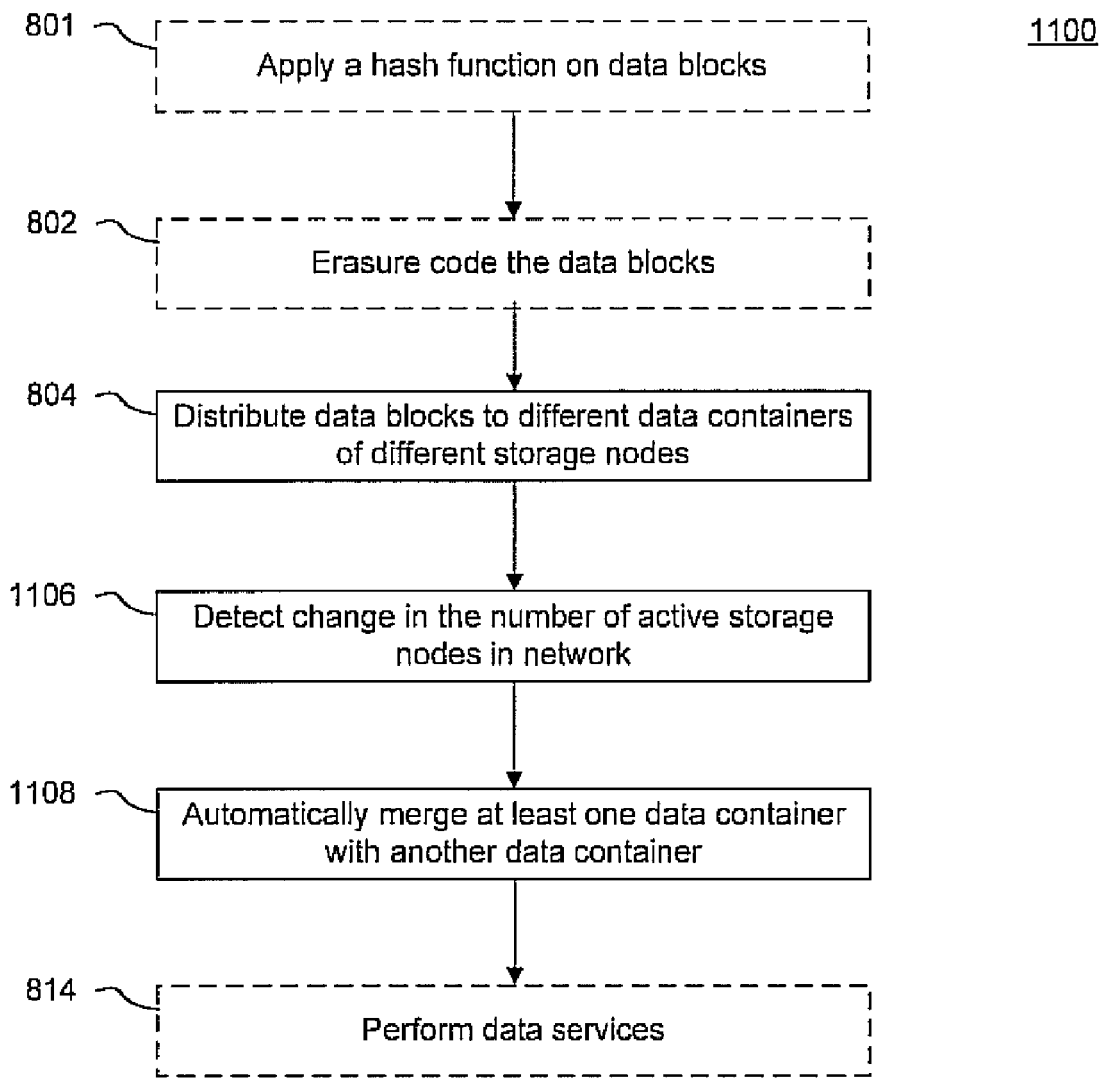
FIG. 11 is a block/flow diagram of a method for managing data in a secondary storage system in accordance with an alternative exemplary implementation of the present principles.

Referring now to FIG. 11 with reference to FIGS. 7 and 8, a method 1100 for managing data on a secondary storage system in accordance with another exemplary implementation of the present principles is illustrated. It should be understood that each of the features discussed above, taken individually or in any combination, of exemplary secondary storage systems and methods may be implemented in method 1100. Thus, the features of method 1100 discussed herein below are merely exemplary and it is contemplated that the features discussed above may be added to method 1100 as understood by those of ordinary skill in the art in view of the teaching provided herein.

Similar to method 800, method 1100 may begin by performing optional steps 801 and 802 as discussed above with respect to FIG. 8. In addition, step 804 may be performed in which data blocks are distributed to different data containers of different storage nodes in a node network to generate redundant chains of data containers in the nodes, as discussed above with respect to FIG. 8.

At step 1106, one or more storage servers may detect a change in the number of active storage nodes in the storage node network. A change in the number of active nodes may include adding at least one storage node to a storage node network and/or removing a node from a storage network. As discussed above, addition or removal of a node may be detected by a peer component or its corresponding storage server by receiving an administration command indicating the additions and/or removals. Further, it should be noted that node failures may be detected by peer components or their corresponding storage servers by employing pings. For example, peer components may be configured to ping each other periodically and infer that a node has failed after detecting that a few pings are missing.

At step 1108, a storage server may be configured to automatically merge at least one data container located in one of the storage nodes with another data container located in a different storage node in response to detecting the change. For example, if a node is added to the network, data containers may be merged subsequent to a split operation as discussed above with respect to rows 710 and 724 of FIG. 7. For example, container 718 may have originated from a different storage node prior to merging with container 716.

Alternatively, if a node is removed from the storage system, storage servers may also be configured to merge data containers from different storage nodes at step 1106. For example, a storage server may receive an administration command indicating that a node is to be removed. Prior to actually removing the node, the storage servers may be configured to merge data containers in the node to be removed with containers in the remaining nodes. For example, the process described above with respect to FIG. 7 at rows 702, 710 and 724 may simply be reversed so that containers from different storage nodes, for example, containers 718 and 720, are merged into larger synchrun chains. The merging may be performed to ensure manageability of the containers and/or to improve system performance. Thereafter, redistribution or rebalancing may be performed, as discussed above. Further, step 814 may be performed at any point of method 1100, for example, as discussed above with respect to FIG. 8.

It should also be noted that exemplary methods and systems according to the present invention may be configured to differentiate between administrative node addition/removal and node failures/restores in the system. Administrative node addition/removal may be indicated in a managing list of nodes which should be in the system. This differentiation is useful in automatic system management. For example, the differentiation may be employed to detect alien or unauthorized nodes which should not be connected to the system according to the administrative list of nodes. For example, when alien nodes attempt to connect with the system, the connection may be rejected or the alien nodes may be removed by employing the administrative list of nodes. The differentiation may also be utilized to compute expected raw capacity of the system in its healthy state, in which all nodes are active, and to differentiate a healthy state from non-healthy states. Other uses of the differentiation are also contemplated.

Exemplary methods and systems described above facilitate efficient and effective provision of several data services in a secondary storage system, such as global deduplication, dynamic scalability, support for multiple redundancy classes, data location, fast reading and writing of data and rebuilding of data due to node or disk failures. Exemplary data organization structures, discussed above, which are based on redundant chains of data containers configured to split, merge and be transferred in response to changes in network configuration permit the implementation of each of these services in a distributed secondary storage system. Redundancy in chain containers, one of several features of exemplary embodiments, permits for failure-tolerance in delivering data service. For example, in the event of a failure, data deletion may proceed even if data is lost, as metadata is preserved due to multiple replicas in the chains. Further, redundancy also permits for efficient, distributed data rebuilding, as discussed above. In addition, both temporal order of storage of data blocks in data containers and summary container metadata enable fast reasoning about the state of the system and permit operations such as data rebuilding. Data block metadata including exposed pointers to other blocks permits the implementation of distributed failure-tolerant data deletion. Moreover, the dynamicity in chain containers allow for efficient scalability. For example, containers may be split, transferred, and/or merged to automatically adapt to changes in storage node network configurations in way that may fully optimize and utilize storage space to provide data services. Furthermore, the dynamicity also permits for easy data location.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for managing data on a secondary storage system comprising:
   distributing data blocks to different data containers located in a plurality of different physical storage nodes in a node network to generate redundant chains of data containers in the nodes;
   detecting an addition of active storage nodes to the network;
   automatically splitting at least one chain of containers in response to detecting the addition, wherein the automatically splitting comprises separating at least one data container from the at least one chain of containers;
   transferring at least a portion of data split from the at least one chain of containers from one of said storage nodes to another of said storage nodes to enhance system robustness against node failures, wherein said at least a portion of data is stored in the at least one data container prior to the splitting; and
   merging said at least one data container with another data container.

2. The method of claim 1, wherein automatically splitting comprises splitting at least one data container and wherein the at least a portion of data is stored in the at least one data container prior to the splitting.

3. The method of claim 1, wherein at least one of said chains of data containers include the same metadata as other chains of data containers, wherein the metadata describes data block information.

4. The method of claim 3, further comprising:
   rebuilding data in response to a failure using said metadata.

5. The method of claim 3, wherein the metadata include pointers between data blocks in the data containers.

6. The method of claim 5 further comprising:
   deleting data using said pointers.

7. The method of claim 1, further comprising:
   erasure coding said data blocks to generate erasure coded fragments, wherein said distributing comprises storing the erasure coded fragments in said different data containers such that fragments originating from one of said data blocks are stored on different storage nodes.

8. The method of claim 7, further comprising:
   determining whether any of said redundant chains of data containers include holes to determine whether at least one of said data blocks is available in the secondary storage system.

9. A secondary storage system comprising:
   a network of physical storage nodes, wherein each storage node includes
   a storage medium configured to store fragments of data blocks in a chain of data containers that is redundant with respect to chains of data containers in other storage nodes; and
   a storage server configured to detect an addition of active storage nodes to the network, to automatically split at least one chain of containers on said storage medium in response to detecting the addition by separating at least one data container from the at least one chain of containers, to transfer at least a portion of data split from the at least one chain of containers to a different storage node to enhance system robustness against node failures, wherein said at least a portion of data is stored in the at least one data container prior to the split and wherein said different storage node is configured to merge said at least one data container with another data container.

10. The system of claim 9, wherein the storage server is further configured to perform at least one of: data reading, data writing, determination of data availability, data transfer, distributed global duplicate elimination, data rebuilding, and data deletion.

11. The system of claim 9, wherein the at least one of said chains of data containers include the same metadata as other chains of data containers, wherein the metadata describes data block information.

12. The system of claim 11, wherein the metadata include pointers between data blocks in the data containers and wherein the storage server is configured to perform data deletion using said pointers.

13. The system of claim 9, wherein the fragments of data blocks are content-addressed on said storage medium in accordance with a hash function.

14. The system of claim 13, wherein different prefixes of content addresses are associated with a different subset of storage nodes.

15. The system of 14, wherein the automatic split comprises extending at least one of said prefixes to generate at least one additional subset of storage nodes.

16. The system of claim 15, wherein the transfer comprises distributing the at least a portion of data split from the at least one chain of containers to the additional subset.

17. A method for managing data on a secondary storage system comprising:
distributing data blocks to different data containers located in a plurality of different physical storage nodes in a node network to generate redundant chains of data containers in the nodes;
detecting a change in the number of active storage nodes in the network; and
automatically merging at least one data container located in one of said storage nodes with another data container located in a different storage node in response to detecting the change to ensure manageability of the containers.

18. The method of claim 17, wherein said change in the number of active nodes comprises at least one of: an addition of at least one storage node to the network or a removal of at least one storage node from the network.

* * * * *